Jan. 28, 1958
H. MAERKER
2,821,590
ROTATIONAL SPEED RESPONSIVE DEVICE
Filed July 7, 1954
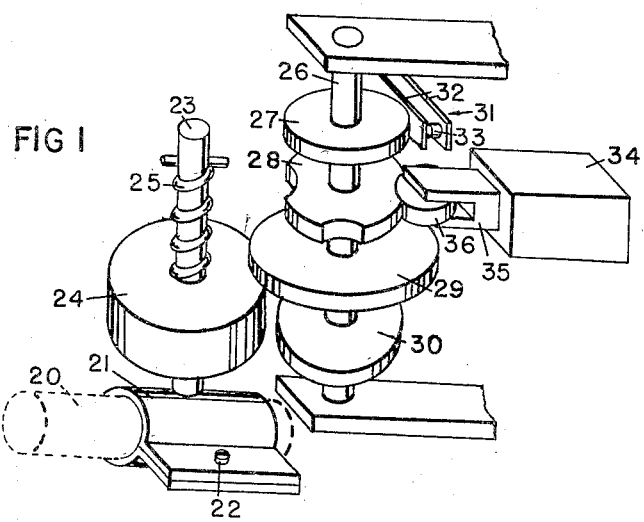
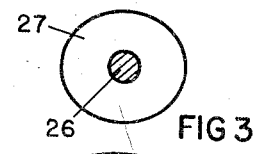
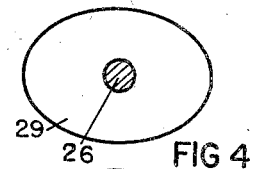
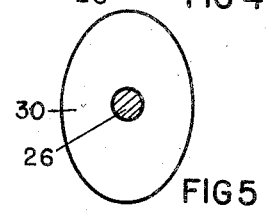
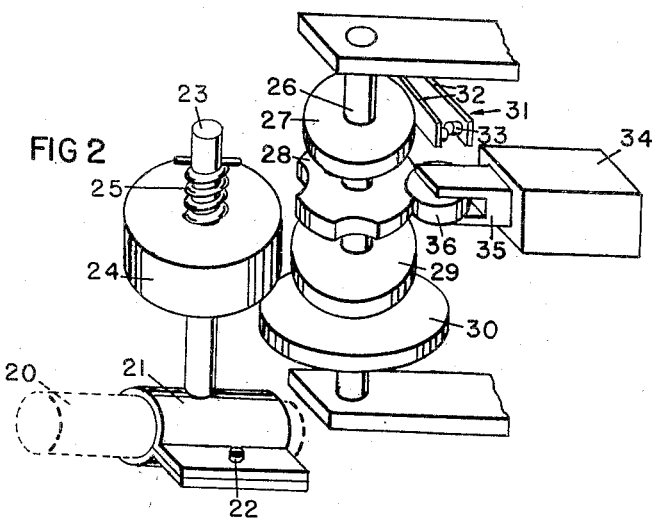
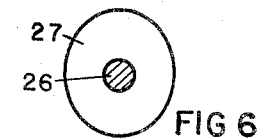
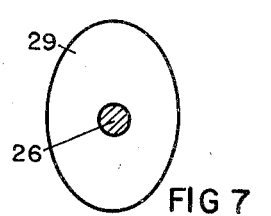
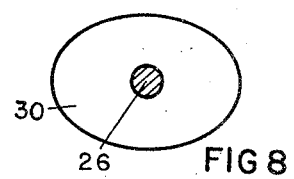
INVENTOR.
HELMUT MAERKER
BY R. W. Hodgson

United States Patent Office 2,821,590
Patented Jan. 28, 1958

2,821,590

ROTATIONAL SPEED RESPONSIVE DEVICE

Helmut Maerker, Los Angeles, Calif.

Application July 7, 1954, Serial No. 441,762

3 Claims. (Cl. 200—80)

The present invention relates to a rotational speed responsive device and, more particularly, to a rotational speed responsive device for a machine having a rotatable shaft.

An object of this invention is to provide a rotational speed responsive device for a machine having a rotatable shaft.

Another object of this invention is to provide a rotational speed responsive device for a machine having a rotatable shaft wherein switching operations may be effected at predetermined speeds of the rotatable shaft.

Still another object of this invention is to provide a rotational speed responsive device for a machine having a rotatable shaft, said device utilizing minimum space along the shaft, and wherein switching operations may be effected at predetermined speeds of the rotatable shaft.

A further object of this invention is to provide a switching device for a machine having a rotatable shaft.

A still further object of this invention is to provide a power switch for electric motors (and/or generators).

The foregoing objects and advantages will appear and be brought out more fully in the following specification, reference being had to the accompanying drawings, wherein:

Fig. 1 illustrates, in perspective, a first embodiment of this invention showing the positioning of the rotational speed responsive device when the shaft of the machine to which the device is connected is rotating at low speed;

Fig. 2 illustrates the embodiment of Fig. 1, and shows the positioning of the rotational speed responsive device when the shaft of the machine is rotating at higher speeds;

Fig. 3 illustrates a top view of the top switching collar shown in Fig. 1 connected to the collar supporting means of the switching device;

Fig. 4 illustrates a top view of the first (or upper) collar shown in Fig. 1 for rotating the collar supporting means in a predetermined position when the shaft of the machine is rotating at higher speeds;

Fig. 5 illustrates a top view of the second (or bottom) collar shown in Fig. 1 for rotating the collar supporting means in a predetermined position when the shaft of the machine is rotating at low speed;

Fig. 6 illustrates a top view of the top switching collar shown in Fig. 2 connected to the collar supporting means of the switching device;

Fig. 7 illustrates a top view of the first (or upper) collar shown in Fig. 2 for rotating the collar supporting means in a predetermined position when the shaft of the machine is rotating at higher speeds; and Fig. 8 illustrates a top view of the second (or bottom) collar shown in Fig. 2 for rotating the collar supporting means in a predetermined position when the shaft of the machine is rotating at low speed.

Referring more particularly to the drawings there is shown a shaft 20 of a machine (not shown) of the type having a rotatable shaft. The machine may be an electric motor (or generator), or any other type of apparatus having a rotating shaft. Fixedly connected to shaft 20 to rotate with said shaft is coupler 21 encircling a portion of the shaft and lightly secured to shaft 20 by bolt 22 through threaded holes in the end flange sections of coupler 21. Coupler shaft 23 is fixedly connected to coupler 21, said coupler shaft 23 and coupler 21 forming a support member for weight member 24. Coupler shaft 23 may be circular in cross-section, rectangular in cross-section, or of any other desired cross-sectional shape. Shaft 20 rotates about its axis, which is essentially perpendicular to the axis of the support member, which is along the length of coupler shaft 23. It is to be noted that a small portion of shaft 20, i. e. the space on shaft 20 necessary for attaching coupler 21, is utilized thereby being an advantage where greater motor shaft space is not available for attaching a rotational speed responsive device. For example, existing machines having rotatable shafts may only have a small portion of shaft space available or accessible, and a rotational speed responsive device of this invention may be attached thereto very easily.

Weight member 24 comprises a material of a relatively heavy mass commensurate with the spring constant of spring 25 and the operating rotational speeds of shaft 20. Weight member 24 may be a circular disc, or of rectangular shape, or any other desired shape. Coil spring 25 encircles coupler shaft 23 and has its axis coincidental with that of coupler shaft 23. One end of spring 25 is fixedly connected to weight member 241, by any appropriate means, and the other end of spring 25 extends through a hole in coupler shaft 23 and is then bent to fixedly connect to the coupler shaft. It is to be understood that any convenient means known in the prior art for fixedly attaching spring 25 to coupler shaft 23 may be utilized (also the arrangement may be tensional, compressional or torsional, etc.). In all of the embodiments weight member 24 has a hole in the center portion thereof to allow weight member 24 to move in a perpendical direction with respect to the axis of shaft 20 or along the axis of coupler shaft 23 of the support member.

Considering now the operation of the members above-described, as shaft 20 rotates, then the support member which is attached thereto will also rotate. As shaft 20 rotationally accelerates, then centrifugal force exerted on weight member 24 will move it against the restraining force of spring 25 away from the axis of shaft 20 and along the axis of coupler shaft 23. If shaft 20 is rotating at a fixed speed then weight member 24 will assume a fixed position depending upon the weight of weight member 24, the rotational speed of shaft 20, and the spring constant of spring 25. At a fixed rotational speed of shaft 20, the centrifugal force on weight member 24 will be constant. If shaft 20 is rotatively decelerating, then the centrifugal force on weight member 24 will diminish and it will move toward the shaft axis along coupler shaft 23. Accordingly, the rotational speed of shaft 20 fixes the positioning of weight member 24.

Also, referring to Figs. 1 through 8, there is shown a means responsive to the position of the weight member, which includes a fixed support, a collar supporting means 26 shown as a circular shaft which may be journaled to the fixed support for rotating therein, a fixed member or switching collar 27 fixedly connected to the collar supporting means 26 (said collar 27 being shown as an elliptically shaped disc), a positioning collar 28 fixedly connected to the collar supporting means 26, and a first collar or fixed member 29 and a second collar or fixed member 30, both elliptically shaped and fixedly connected to the collar supporting means 26. The collars are consecutively connected in the order mentioned and as shown in Figs. 1 and 2. Collars 27, 29 and 30 are shown to be elliptically shaped but may be of any shape to perform the functions later described. In order to clearly show the relative positioning of the collars as seen by a top view, Figs. 3, 4 and 5 show the top views of the switching collar 27, first collar 29 for rotating the collar supporting means 26, and second collar 30 for rotating collar supporting means 26, respectively, as shown in Fig. 1. Also, Figs. 6, 7 and 8 show the top views of the switching collar 27, first collar 29 for rotating the collar supporting means 26, and second collar 30 for rotating collar supporting means 26, respectively, as shown in Fig. 2. The long elliptical axis of collar 27 and that of collar 29 are in line and in line with the short elliptical axis of collar 30. Collar 28 is a circular disc having cutouts on the circumference every 90 degrees therealong.

Switch 31 has a pair of contact blades 32 connected to a fixed support at one end (not shown) and having electrical contact points 33 at the other end. In the normal position as seen in Fig. 2, contact blades 32 are positioned so that electrical contact points 33 do not make electrical contact. In order to engage positioning collar 28 and form a positioning means for collar supporting means 26, there is a positioning collar holder having a base member 34 fixedly supported by a support (not shown), said base member 34 carrying a slidable shaft 35 having a roller 36 adapted to press against collar 28 due to spring mounting of shaft 35 within the base member 34.

Considering now the operation of the embodiment shown in Figs. 1 through 8, when shaft 20 isn't rotating (or is rotating at low speeds), then weight member 24 will be in the position shown in Fig. 1. Fig. 2 shows projections 37 to prevent weight member 24 from moving closer to shaft 20 than that shown in Fig. 1. In the position shown in Fig. 1, weight member 24, upon rotating about the axis of shaft 20, will force collar 30 to rotate collar supporting means 26 to the position shown in Fig. 1 and Fig. 5 whereby weight member 24 will not contact collar 30 thereafter. Roller 36 on shaft 35 will be pressurably engaged in a new 90 degree displaced cutout portion of collar 28 thereby accurately positioning collar supporting means 26. When in this position the long elliptical axis of collar 27 will be directed toward contact blades 32 forcing them together and causing contact points 33 to make electrical contact. Accordingly at low speeds of rotation of shaft 20, the rotational speed responsive device will close an electrical circuit.

Now, if the rotational speed of shaft 20 is accelerated, then weight member 24 will move away from shaft 20 along the axis of the support member due to centrifugal force on weight member 24. At a certain rotational speed, weight member 24 will be in position to engage collar 29 and force it to turn 90 degrees and rotate the collar suporting means 26 until the short axis of collar 29 is directed toward weight member 24 as shown in Fig. 2 and Fig. 7. As the collar supporting means 26 is forced to rotate, shaft 35 will be forced to move inside base 34 until roller 36 clears the cutout in collar 28. The collar supporting means 26 will rotate until shaft 35 will force roller 36 into the next cutout in collar 28. The position of the support member and the collar supporting means 26 at higher speeds of shaft rotation are shown in Fig. 2. As may be seen, collar 27 has rotated so that no pressure is applied to contact blades 32 allowing them to separate into their normal position and breaking the electrical circuit therethrough.

If the rotational speed of shaft 20 is decreased, then weight member 24 will move toward shaft 20 and subsequently engage collar 30 to rotate collar supporting means 26 back into the position shown in Fig. 1.

It is to be noted that collar 27 may be eliminated and contact blades 32 may be positioned to be engaged by collar 29 or collar 30. In the latter case, the switching operation will be reversed, i. e. the switch will be open at low shaft speeds and closed at higher shaft speeds.

As an example of a use of this rotational speed responsive device, a single phase capacitor-start motor requires a capacitor to split the single phase current applied to the motor when starting. After the motor has attained operating speed, then the capacitor should be removed from the circuit as the single phase applied current will operate the motor. The rotattional speed responsive device of this invention may be utilized to perform this function.

Numerous modifications and variations of the present invention will occur to those skilled in the art after a careful study hereof. All such properly within the basic spirit and scope of the present invention are intended to be included and comprehended herein as fully as if specifically described, illustrated and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A rotational speed responsive device for a machine having a rotatable shaft, said device comprising: a support member connected to rotate with the shaft; a spring connected to the support member; a weight member connected to the spring whereby said weight member will move in a perpendicular direction away from the shaft due to centrifugal force on said weight member when the shaft is rotatively accelerating; and means responsive to the position of the weight member, said means including a fixed support, a collar supporting means journaled to the fixed support, a first collar fixedly connected to the collar supporting means and engageable by the weight member at a first predetermined position of the weight member to rotate the collar supporting means to a first predetermined position of the collar supporting means, and a second collar fixedly connected to the collar supporting means and engageable by the weight member at a second predetermined position of the weight member to rotate the collar supporting means to a second predetermined position of the collar supporting means; and positioning means cooperable to accurately position the collar supporting means in its first and second predetermined positions.

2. The device according to claim 1 which additionally includes a switch responsive to the positioning of the collar supporting means.

3. The device according to claim 2 wherein said switch is responsive to the positioning of the collar supporting means by a third collar fixedly connected to the collar supporting means, said switch being actuable by the third collar.

References Cited in the file of this patent

UNITED STATES PATENTS

| 1,789,683 | Leeds | Jan. 20, 1931 |
| 2,346,341 | Werner | Apr. 11, 1944 |
| 2,442,170 | Heintz | May 25, 1948 |
| 2,624,814 | Shewmon | Jan. 6, 1953 |